(12) United States Patent
Merz et al.

(10) Patent No.: US 6,171,000 B1
(45) Date of Patent: Jan. 9, 2001

(54) GIMBALED ROLLER ASSEMBLY PROCESS AND DEVICE

(75) Inventors: Gary E. Merz; Edward B. Richter; Jeffrey Vanhall; Steven P. Vogel, all of Rochester; Garry L. Wohlschlegel, Hemlock, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/212,458

(22) Filed: Dec. 16, 1998

(51) Int. Cl.[7] .............................. G03B 17/26; B23P 19/04

(52) U.S. Cl. .............................. 396/515; 29/468; 29/525; 29/806

(58) Field of Search .................................. 396/207, 512, 396/515; 29/464, 468, 525, 806, 743

(56) References Cited

U.S. PATENT DOCUMENTS

| | | | |
|---|---|---|---|
| 4,974,316 | * | 12/1990 | Suzuki et al. .......................... 29/806 |
| 5,044,144 | * | 9/1991 | Foote, Jr. et al. ..................... 29/806 |
| 5,074,034 | * | 12/1991 | Lebbon .................................. 29/806 |
| 5,119,549 | * | 6/1992 | Foote, Jr. et al. ..................... 29/806 |
| 5,511,300 | * | 4/1996 | Merz et al. ............................ 29/806 |
| 5,617,625 | * | 4/1997 | Esaki et al. ............................ 29/806 |
| 5,708,879 | | 1/1998 | Manica et al. . |
| 5,715,494 | | 2/1998 | Harris et al. . |

\* cited by examiner

*Primary Examiner*—Alan A. Mathews
(74) *Attorney, Agent, or Firm*—Mark G. Bocchetti; Arthur H. Rosenstein

(57) ABSTRACT

An assembly technique has been developed which reliably inserts the outer disk of an exposed film indicator into the crimp diameter of the cartridge end cap. This process gimbals the fixture containing the film cartridge, and rocks it in a manner that creates a circular wobble motion.

9 Claims, 15 Drawing Sheets

GIMBALED ROLLER ASSEMBLY PROCESS AND DEVICE

FIELD OF THE INVENTION

The invention relates generally to the field of manufacturing, and in particular to parts manufacturing and assembly.

BACKGROUND OF THE INVENTION

What is needed in the art is a film cartridge which will indicate whether the film in the cartridge has been exposed.

Recently there has been a desire by snap-shooters, photo enthusiasts, and professionals to be able to determine if a roll of film has been advanced through a camera or has never been used. This can be accomplished by attaching an exposed film indicator to the long end of the spool on a 35 mm cartridge. This is primarily needed when shooting multiple rolls of film, or for the purpose of some consumer and professional cameras, when a roll is only partially exposed to be used again later.

One problem involving assembling the exposed film indicator to the cartridge, is developing a method to reliably attach two thin disks to the long hub end of the spool. The inner (or exposed) disk is attached to the spool hub by three barbs and therefore rotates with the spool. The word EXPOSED may be printed on it, or to differentiate from the outer disk, it may be a different color. The outer (or unexposed) disk is attached to the crimp diameter of the end cap. It remains stationary relative to the cartridge. The word UNEXPOSED may be printed on it, or, again to differentiate from the inner disk, it may be a different color. When a customer purchases a fresh roll of film, the outer disk on the exposed film indicator will be visible. As film is wound back into the cartridge after the pictures are taken, a tab that sticks up on the inner disk engages a tab that sticks down on the outer disk. The inner disk then exits through a slot in the outer disk and is visible to the customer.

U.S. Pat. No. 5,708,879 shows a film cartridge with a visual exposure status indicator.

U.S. Pat. No. 5,715,494 is another example of a film cartridge with a visual exposure status indicator.

To implement adding exposure indication to a 35 mm film cartridge in a timely and cost effective manner, it is necessary to minimize the impact on the existing manufacturing infrastructure. Given the complexity of this infrastructure and the space constraints around the equipment, it is highly desirable to add the feature after the film cartridge is completely assembled. Since the completed film cartridge is loaded into the canister at the end of the film winding operation, the feature must be assembled to the cartridge either by removing the cartridge from the canister or while the cartridge is in the canister. It is advantageous to assemble the feature to the film cartridge while it is in the canister since:

1) The canister provides a convenient method of conveying and singulating the film cartridges for the assembly operations.
2) It is difficult to reinsert the film cartridge back into the canister without using a special motion to wrap the film leader around the cartridge.
3) Reduced handling of the cartridges and thus the potential for cosmetic damage to either the cartridge or the film leader is reduced.
4) Equipment space limitations does not permit cartridge removal.

SUMMARY OF THE INVENTION

The above problem of applying an exposed film indicator to the cartridge after assembly of the cartridge is solved by applying the gimbaled roller process described herein.

The invention provides a means of reliably inserting the outer disk of the exposed film indicator into the crimp diameter of the cartridge end cap on the long hub end of the spool.

The assembly process will accept the canned cartridges opened end up, either from a tray unloader or from a centrifugal feeder. Individual canisters will be singulated on the infeed conveyor, using a separator screw. They will then be loaded onto either a continuous motion rotary assembly turret, a dial indexer or some type of assembly chassis. Using this motion generated by the chassis and the gimbaled roller tooling, this process can be used to find the center of the spool and assemble the outer disk of the exposed film indicator to the cartridge by pressing the outer disk into the crimp diameter of the cartridge end cap.

Significant interference is required between the outside diameter on the outer disk and the end cap crimp diameter to provide sufficient torsional retention. Because of this diametrical interference, straightline insertion may not be sufficiently reliable. A process has been developed to rock the fixture containing the film canister and cartridge. This motion can take the form of either a pivot about a shaft or a circular "wobble". The net result of the motion is to present the crimp diameter of the end cap to the outside diameter of the outer disk in a manner that only a few of the engagement tabs on the outer disk are inserted into the crimp diameter at any point in time.

It is noted that if desired, the functionality of the exposed film indicator can be reversed by having the inner disk designated as unexposed and the outer disk designated as exposed and assembled to the cartridge in reverse order.

BRIEF DESCRIPTION OF THE DRAWINGS

The foregoing and other objectives, features, and advantages of the invention will be apparent from the following more particular description, including the presently preferred embodiments of the invention, as illustrated in the accompanying drawings in which.

DETAILED DESCRIPTION OF THE INVENTION

Figure 1:
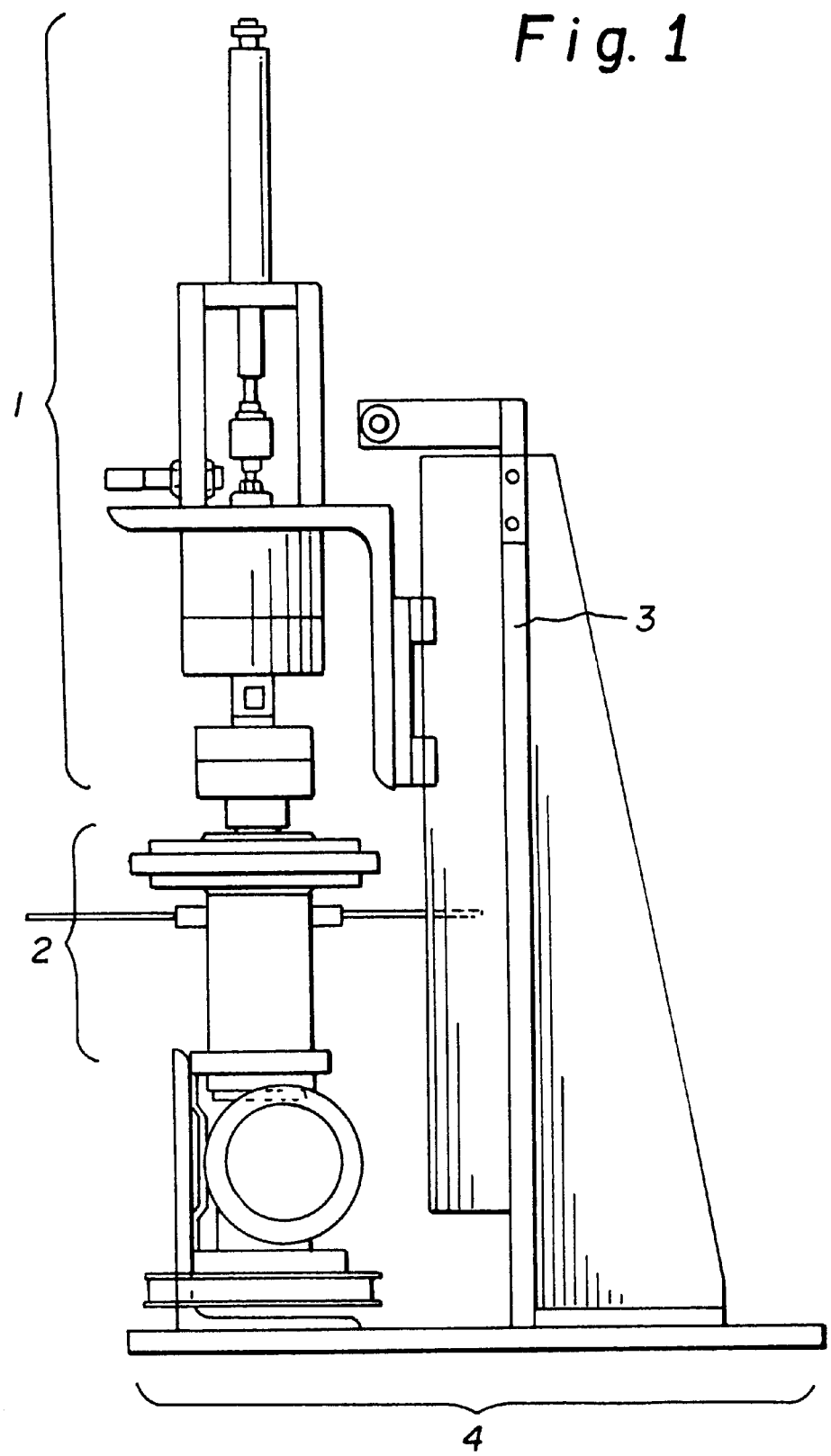
FIG. 1 shows the general assembly of the gimbaled assembly mechanism.

FIG. 1 shows the general assembly of a mechanism designed to assemble a thin flexible disk to the end of a cartridge such as a 35 mm film cartridge that is already in a plastic canister. The major components of the assembly consists of a tooling head sub-assembly 1, a nest sub-assembly 2 and a cam actuator sub-assembly 4. The tooling head 1 is driven up and down vertically by a lead screw assembly 3.

Figure 2:
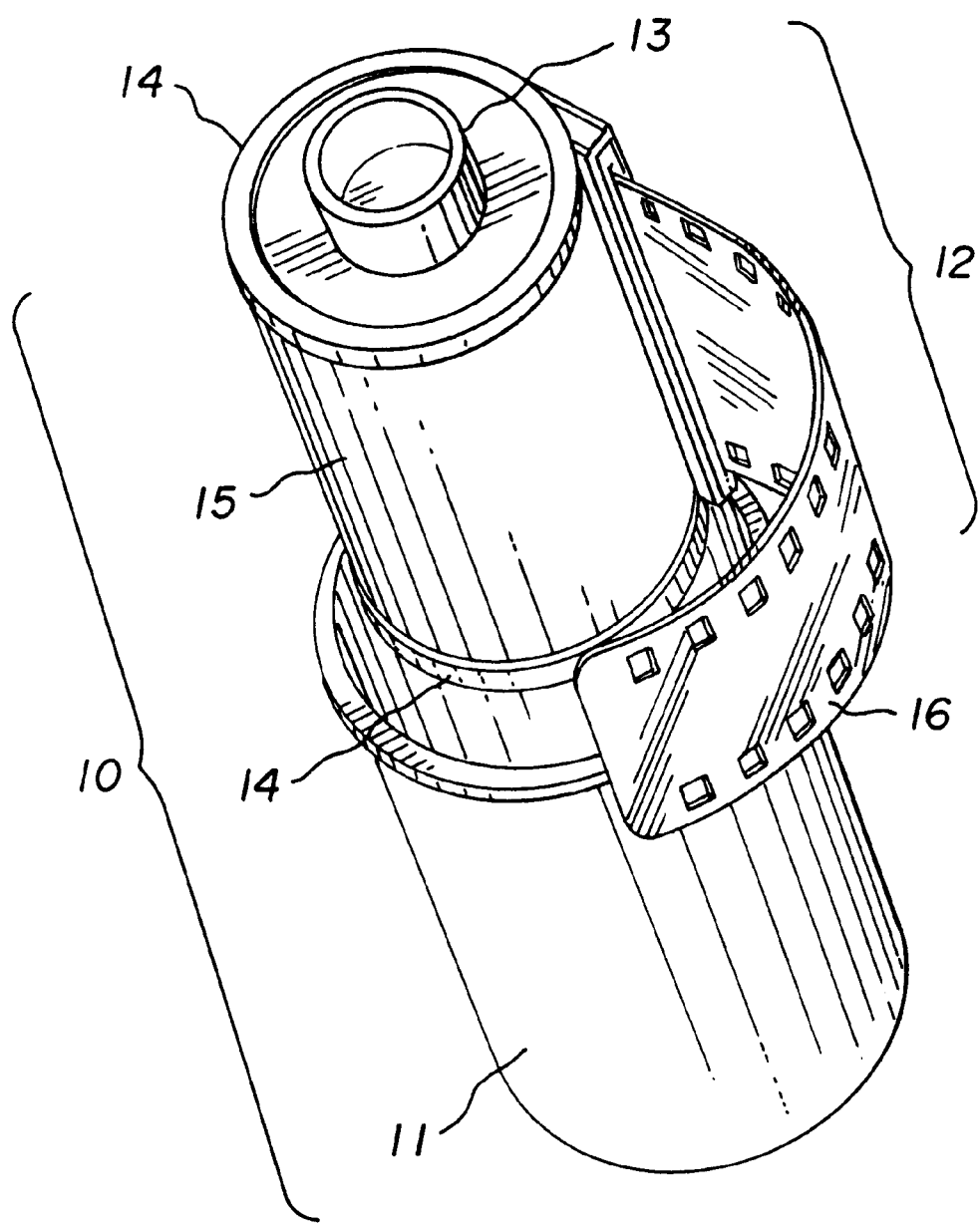
FIG. 2 is an exploded view of the product, typically a 35 mm film cartridge and a canister.

FIG. 2 is an enlarged view of the product 10, which consists of a plastic canister 11 and a 35 mm cartridge 12. The cartridge 12 is made up of a spool 13, preferably made of plastic, a steel shell or magazine 15, and two steel end caps 14, which are staked onto the ends of the magazine . Protruding out of the cartridge (preferably approximately 58 mm) is the film leader 16. The film leader 16 tends to act as a leaf spring and pushes the cartridge 12 up against the inside wall of the canister 11 on the side opposite from where the film exits the cartridge 12. This phenomenon helps hold the cartridge 12 in one place relative to the inside of the canister 11. Note that the cartridge 12 is free to move anywhere within the confines of the canister 11.

Figure 3:
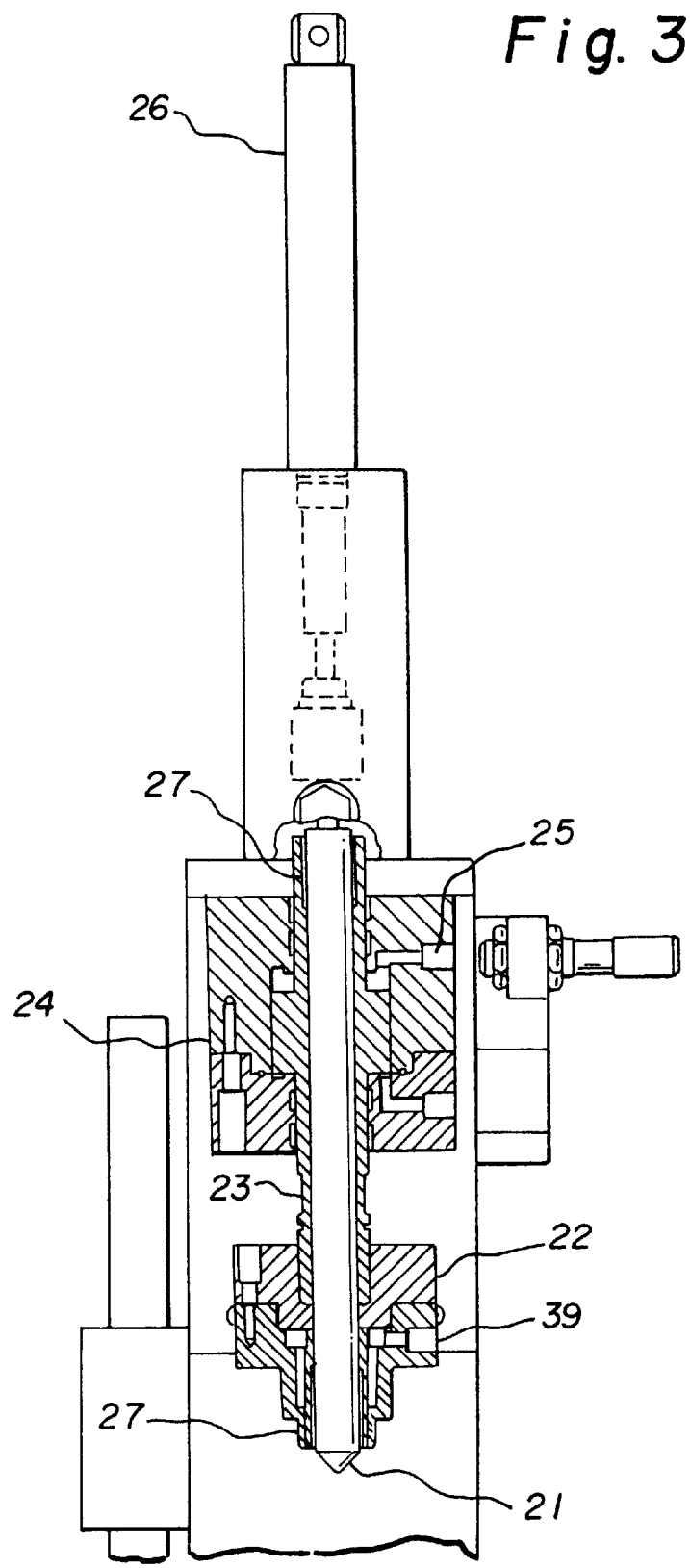
FIG. 3 is an enlarged view of the tooling head.

FIG. 3 is an enlarged view of the tooling head which provides a means to hold the outer disk in place during the assembly operations, and provides a means to properly locate the outer disk on center until it is assembled to the cartridge 12. The tooling head consists of a centering shaft 21, and a vacuum or tooling head 22, that holds the outer exposed film indicator disk in place at the tip. The tooling head 22 is attached through a coupling or piston 23 to an air spring 24. The air spring is supplied with an adjustable air pressure through the inlet port 25. The centering shaft 21 moves vertically, and independently relative to the tooling head 22. The movement of the centering shaft 21 is controlled by an air cylinder 26 and is supported by two bearings 27, which are pressed into the piston 23 and the tooling head 22.

Figure 4:
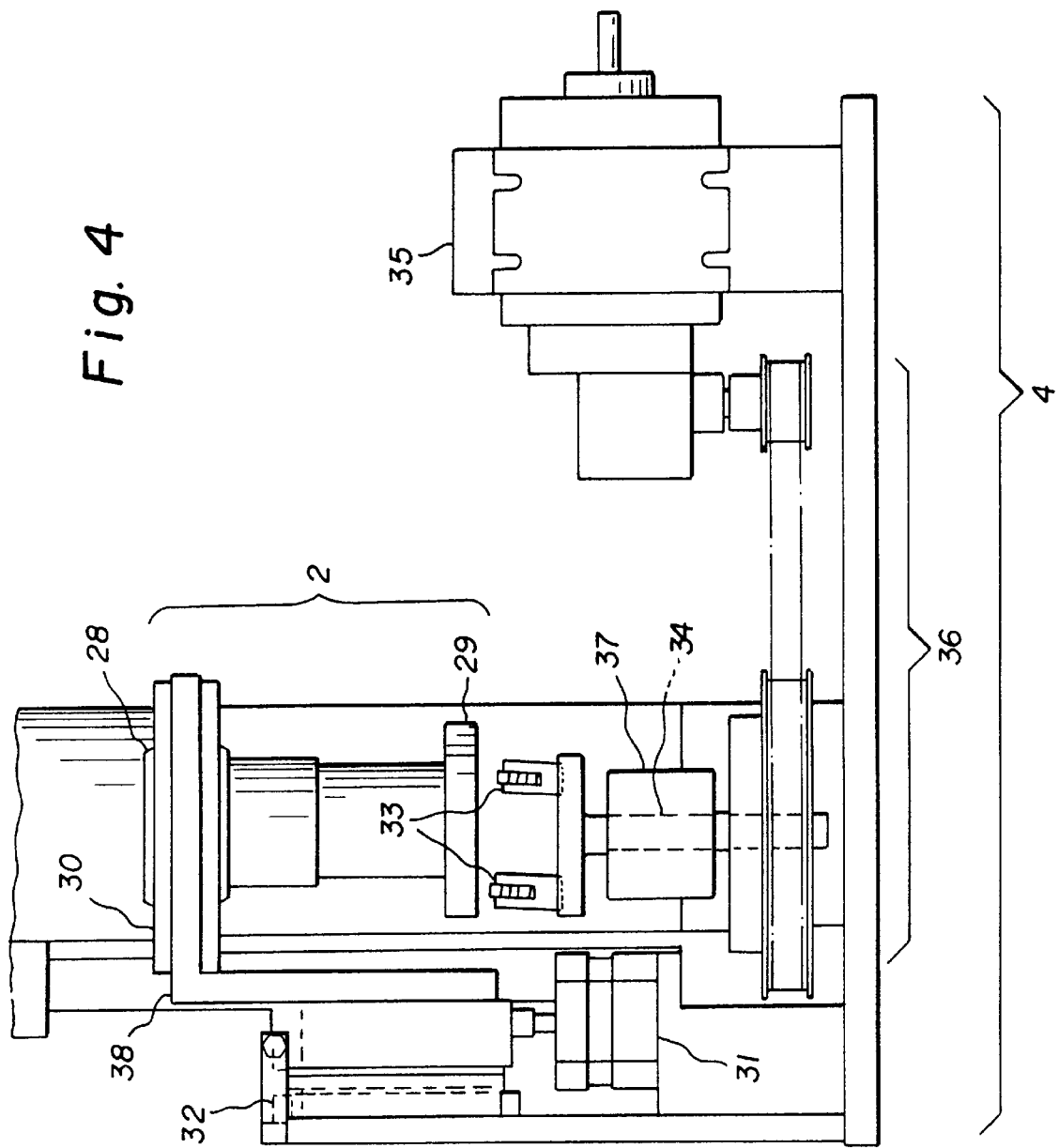
FIG. 4 is an enlarged view of the nest and cam subassemblies.

FIG. 4 is an enlarged view of the nest sub-assembly 2 whose function is to support the product assembly 10, consisting of the canister 11 with the cartridge 12 inside during the assembly operation. The nest sub-assembly 2 which contains a nest 28, and a cam 29, is captured in a spherical bearing seat 30 that will allow it to rock back and forth in an orbital motion. The nest sub-assembly 2 is driven up and down vertically by an air cylinder 31 attached to a slide 32 and the nest support bracket 38. When the nest sub-assembly 2 is lowered, the cam plate 29 presses against the cam followers 33, causing the nest assembly to tip. The cam followers 33 are mounted on a spindle 34 which rotates by energizing a motor 35 that is attached to the spindle 34 through a belt and pulley assembly 36. The spindle 34 is mounted in a bearing block 37.

Figure 5:
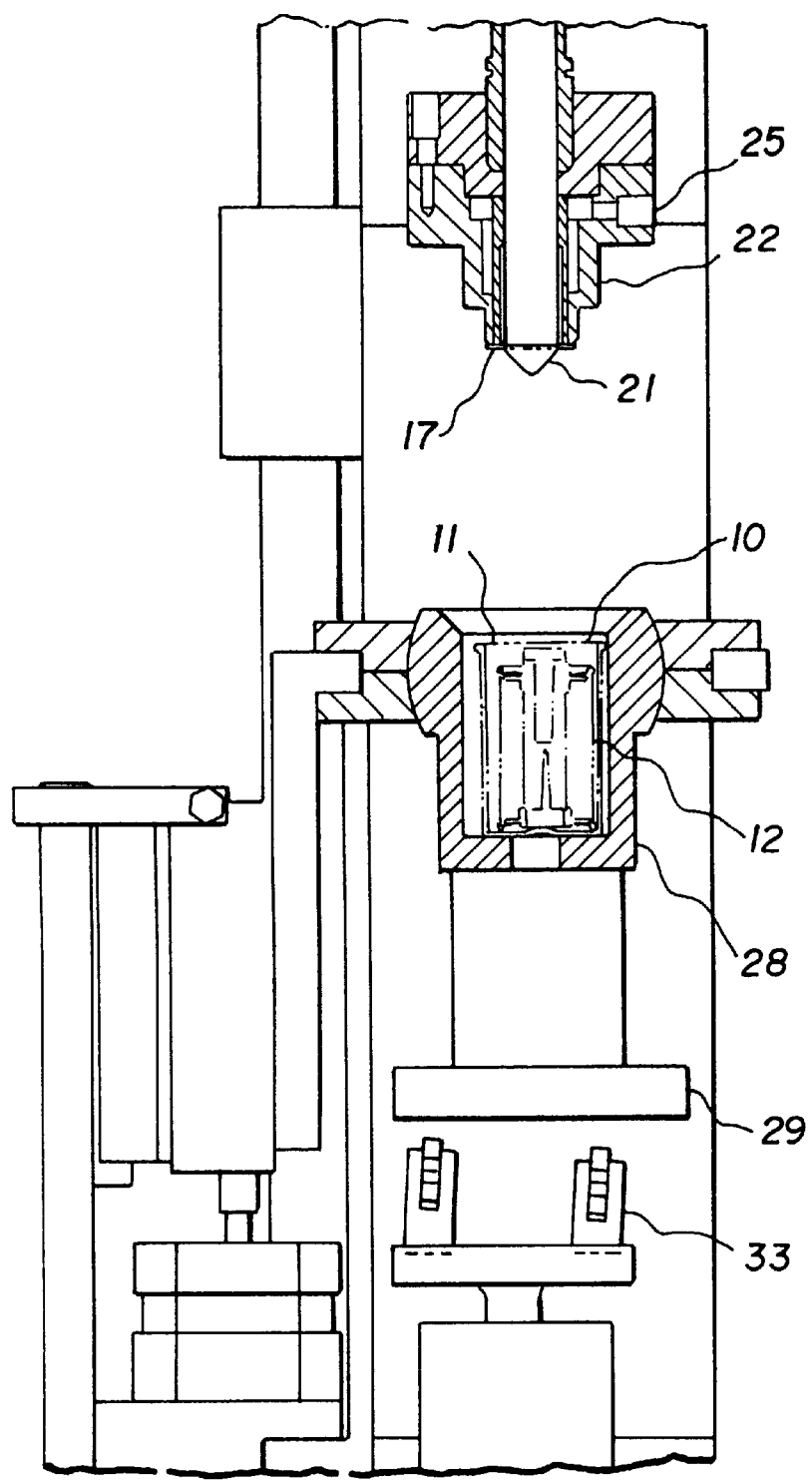
FIGS. 5 through 14 show the sequential positions of the tooling required to assemble the disk to the end of the cartridge.

FIGS. 5 through 15 are enlarged views of the sequential steps required to assemble the outer exposed film indicator disk to the end of the cartridge. FIG. 5 shows the tooling head 22 in the load position. In all the following figures, the tooling head is raised or lowered as required, by the lead screw 3 shown in FIG. 1. The nest 28, with the cam plate 29, is also raised up off the cam followers 33, and is therefore in a vertical position. The outer disk 17 is placed on the tooling head 22 over the centering shaft 21 and held by vacuum. Vacuum is supplied at port 39, and then internally ported through the tooling head in order to hold the outer disk 17 onto the bottom of the head. The canister 11, with a cartridge 12 inside, is placed in the nest 28.

Figure 6:
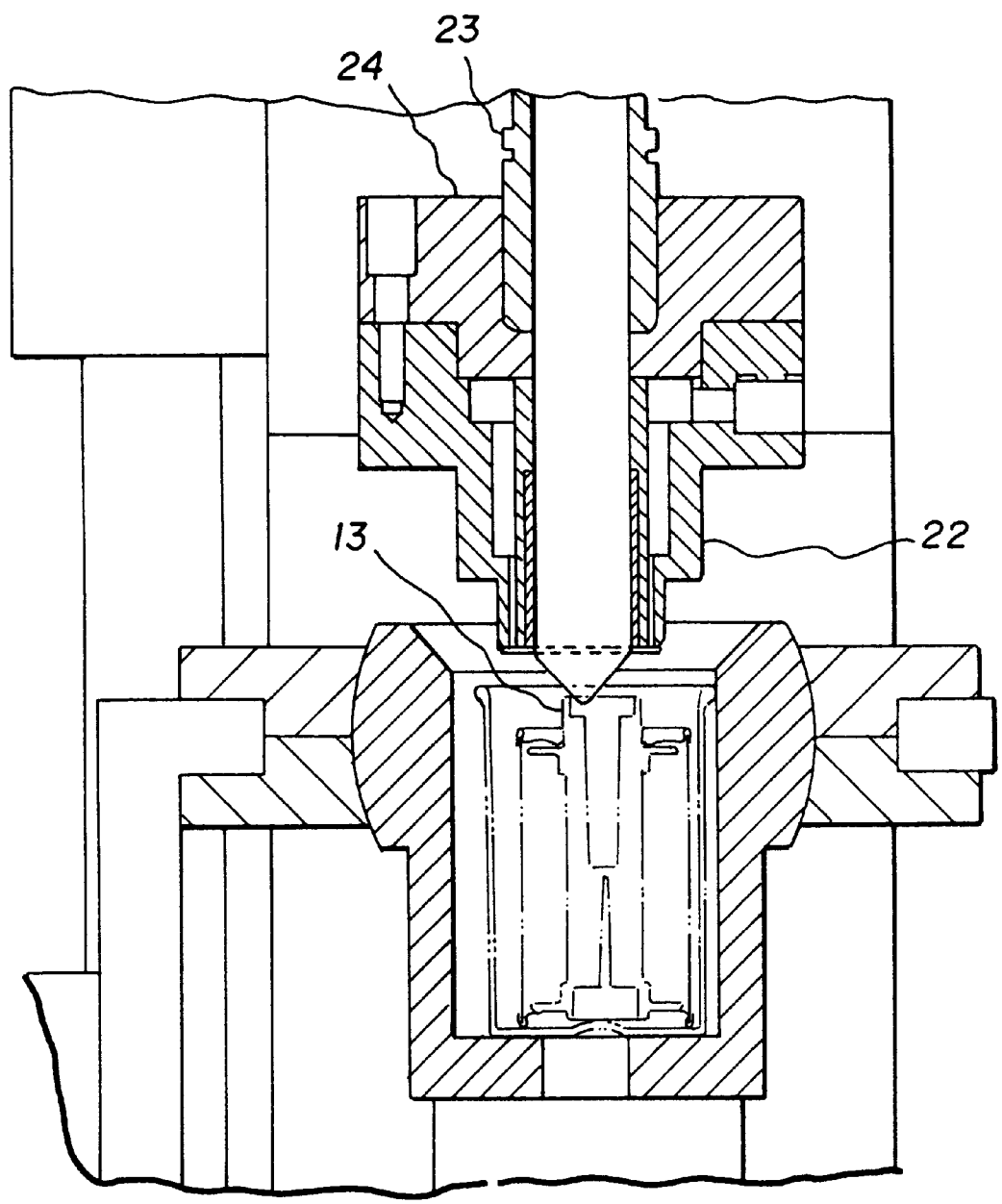

FIG. 6 shows the tooling head 22 after it has been lowered to a position where the centering shaft 21 has just entered the end of the spool 13, and has captured it within the confines of the inside diameter of the spool.

Figure 7:
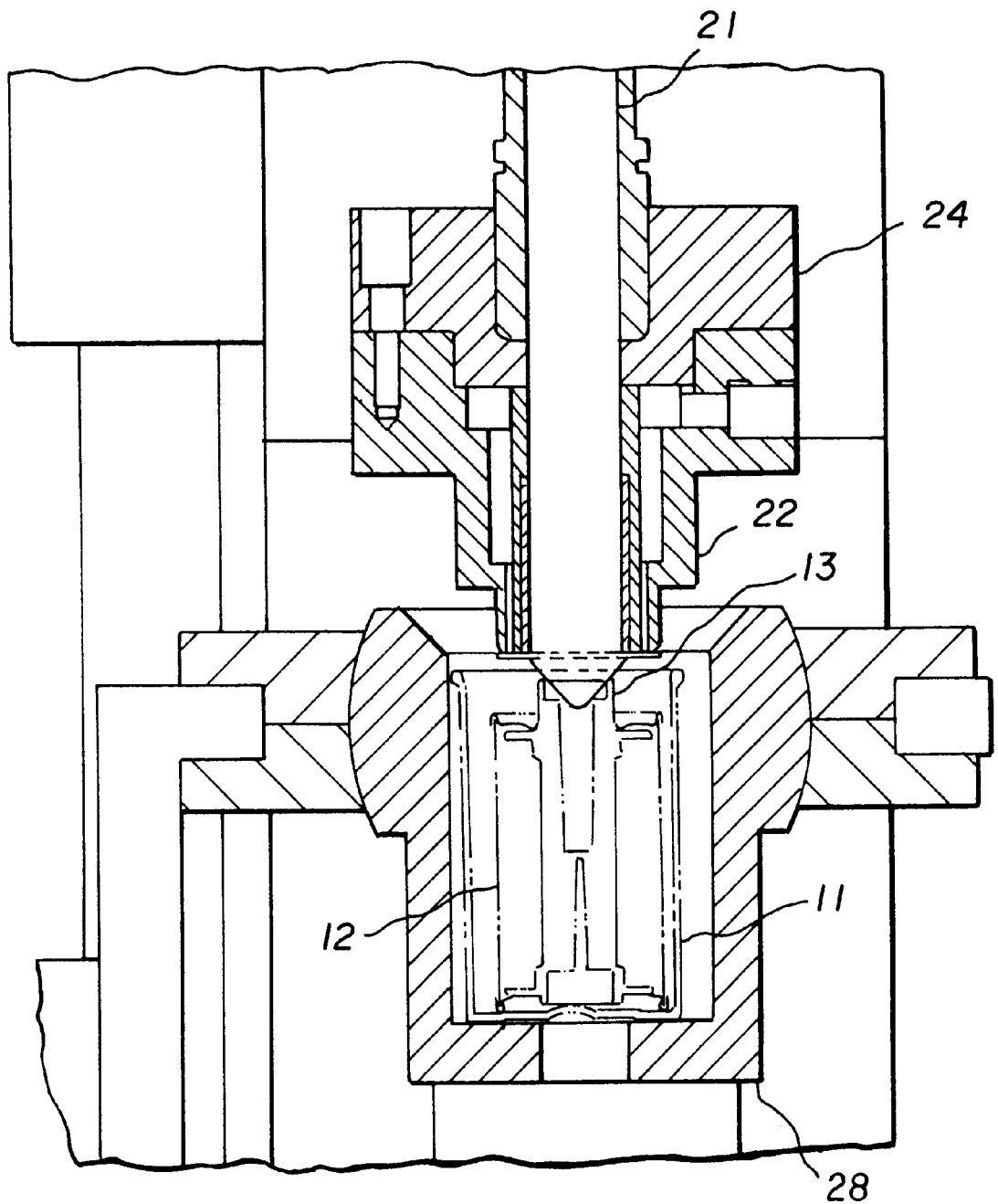

The tooling head 22, along with the centering shaft 21, will continue to lower slowly until it reaches the position shown in FIG. 7. Because the tip of the centering shaft 21 is a cone, it acts as a wedge and pushes the edge of the spool 13 away from the wedge or centering shaft 21. Since the spool 13 is captured inside the cartridge assembly 12, the cartridge will move with the spool 13. The cartridge 12 in turn, is inside the canister 11 and coupled to the canister through the leader 16. Therefore, the canister 11, will also attempt to move with the spool 13. In other words, the entire product assembly 10 moves as the wedge or centering shaft 21 pushes it. Since the wedge is a conical surface, as it pushes itself away from one side, it gets closer to the other side of the inside of the spool 13. As the tooling head 22 and centering shaft 21 continue to lower, the clearance between the inside diameter of the spool 13 and the conical tip of the centering shaft 21 decreases, until eventually the tip is seated firmly into the spool 13. At this point, the cartridge 12 is centered relative to centering shaft 21. It is preferred that the bottom of the nest 28 is smooth, so that as the wedge or centering shaft 21 attempts to move the product, the frictional force developed between the bottom of the canister 11 and the nest 28, is less than the force developed by the wedge. If the frictional force is too large, the product 10 will not move, hence, the product 10 will not center itself and/or the tip of the spool 13 will be damaged. If however, the canister 11, were prevented from moving further, (as a result for example, of pressing against the edge of the nest or excessive friction between the canister 11 and the nest 28) the cartridge would still continue to move towards center because the film leader 16, which couples the cartridge 12 to the canister 11 is a compliant member and therefore would collapse as needed.

Figure 8:
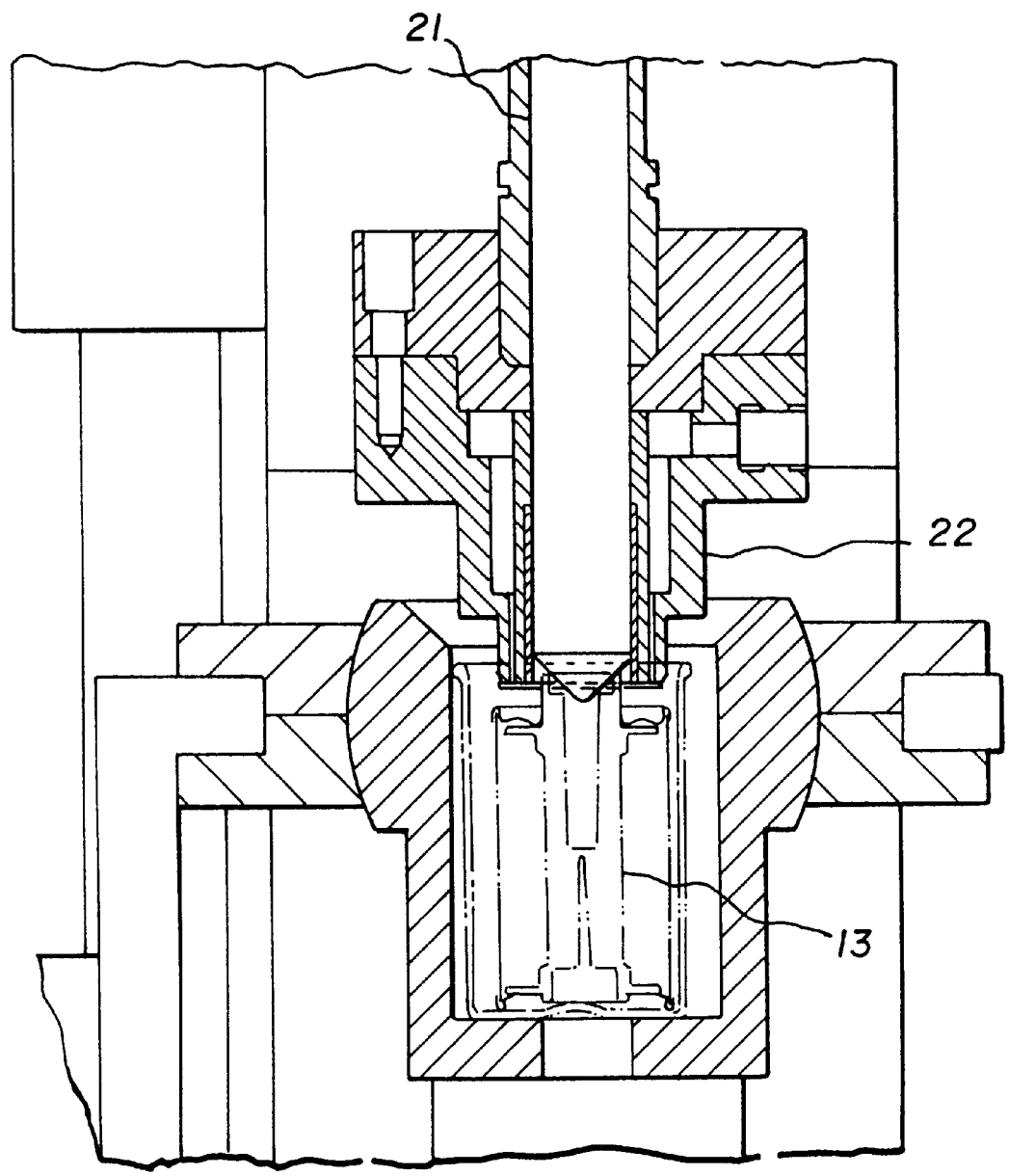

In FIG. 8, the tooling head 22 has lowered slightly so that the tip of the vacuum or tooling head 22 has now also captured the spool 13, thus preventing it from losing its center orientation relative to the tooling head 22. The centering shaft 21 remains in the same vertical position as it was in FIG. 7, still holding the spool 13, and the product assembly on center with the tooling head 22. Therefore the tooling head must have the ability to move independently relative to the centering shaft.

Figure 9:
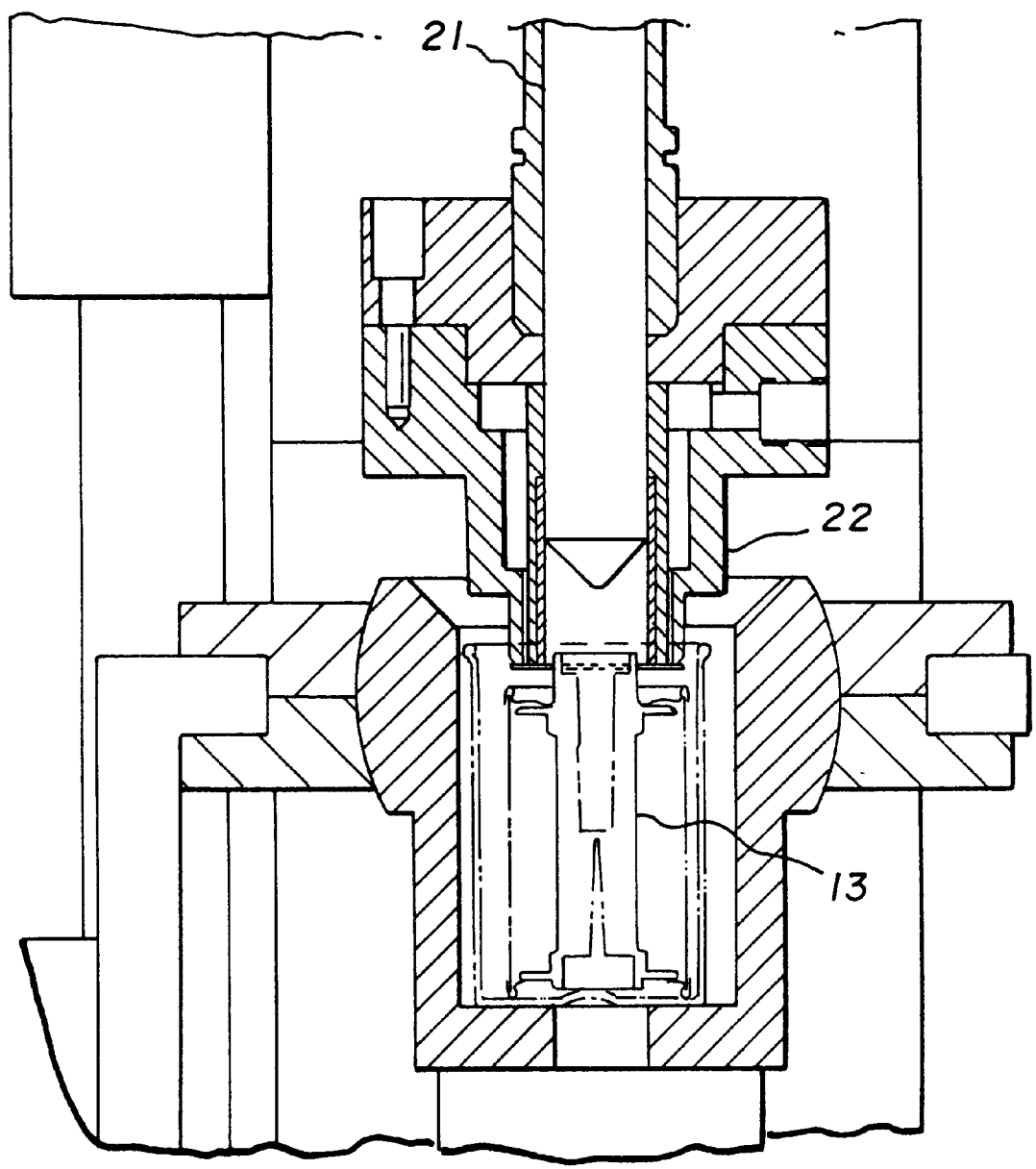

In FIG. 9 the centering shaft 21 has retracted approximately ½ inch. The spool 13 however, is still constrained by the tooling head 22, but does have the freedom to translate by an amount equal to the clearance between the inside diameter of the tooling head 22 and the outside diameter of the spool 13.

Figure 10:
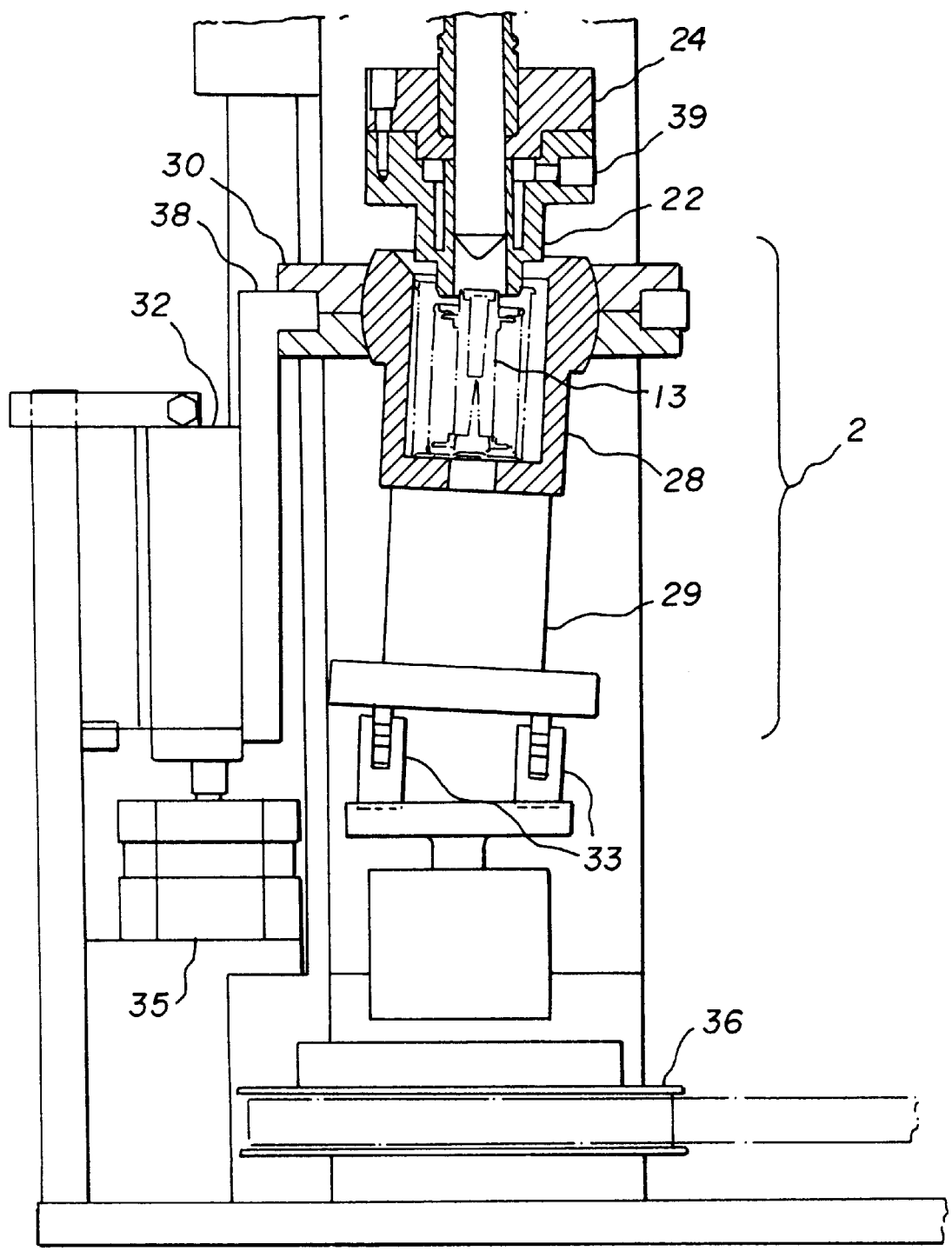
Figure 11:
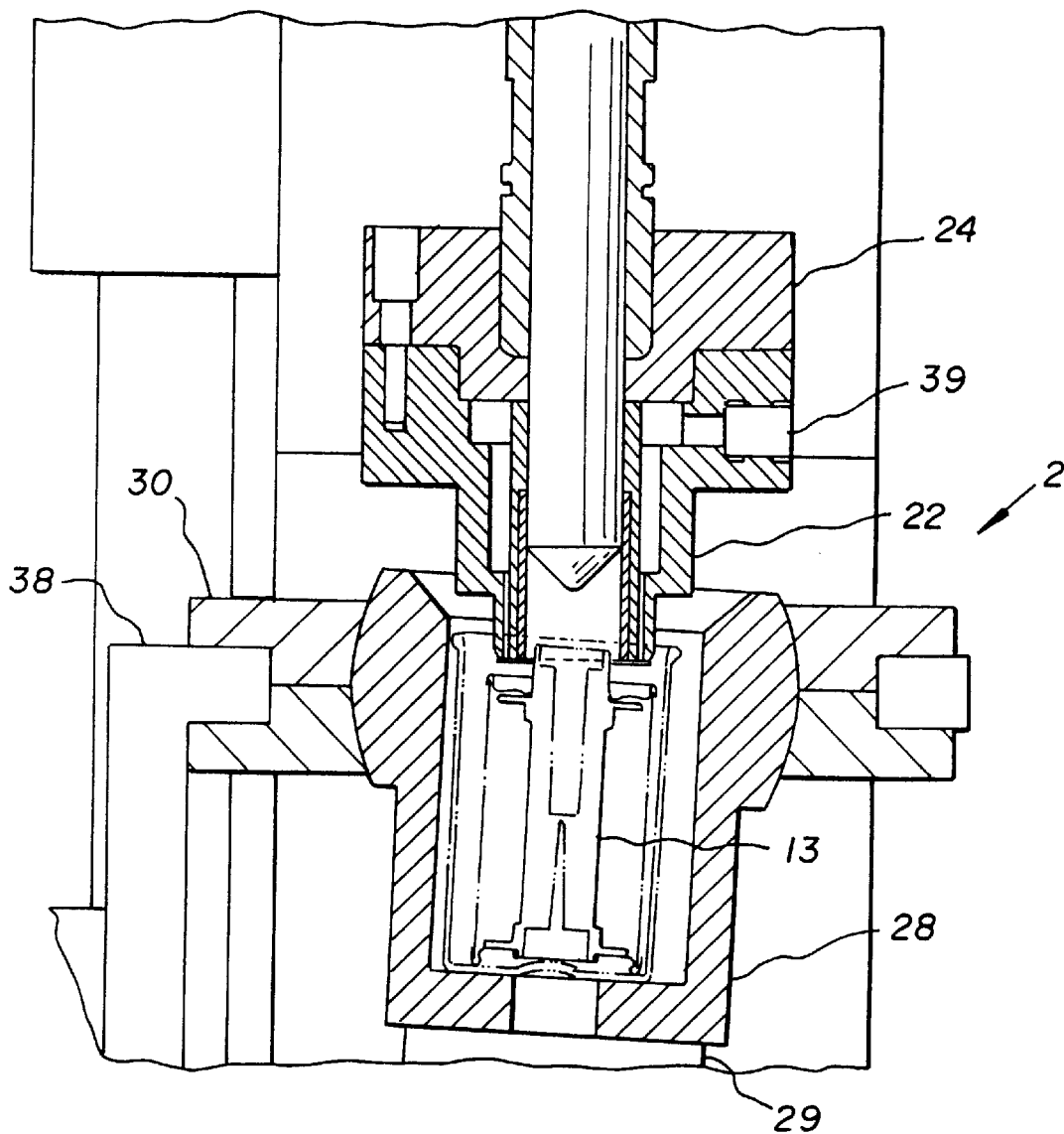

FIG. 10 shows the nest assembly which contains the nest 28, spherical bearing seat 30, nest support bracket 38, roller slide 32, and an air cylinder 31. The nest 28 is lowered, preferably ¼ inch, by the air cylinder 31. When it is lowered, the cam 29 attached to the bottom of the nest 28, is forced up against the cam followers 33. Because the cam followers 33 are at a different height (as shown) the nest assembly 2 will tilt to the side. At the same time that the air cylinder 31 begins to lower the nest assembly 2, the tooling head 22 also lowers the same distance and at the same rate, maintaining the same relationship between the product assembly 10 and the tooling head 22, thus keeping the spool 13 constrained. As the air cylinder 31 begins to lower the nest assembly, as shown in FIG. 4, the motor 35 begins to turn. Coupled to the motor through a pulley assembly 36 is a spindle 34, which is attached to the cam follower assembly 33. Referring back again to FIG. 10, the spindle 34 with the cam follower 33 attached begins to rotate. The cam 29, which simultaneously was lowered, approaches the cam follower 33. Since the two cam followers 33 are each at different heights, the cam 29 will first touch one of the followers, and since the cam follower is offset from the centerline of the cam 29 and nest 28, the nest will attempt to tilt. Because the nest is contained by a spherical bearing seat 30, there is nothing to prevent the nest 28 from tilting. As the air cylinder 31 continues to press the nest 28 lower, the nest will tilt until it touches both followers 33, as shown. At that point the nest 28 is tilted to its maximum angle allowed based on the difference in height of the cam followers 33. This angle can be varied by adjusting the difference in height. FIG. 11 is an enlarged view of FIG. 10.

Figure 12:
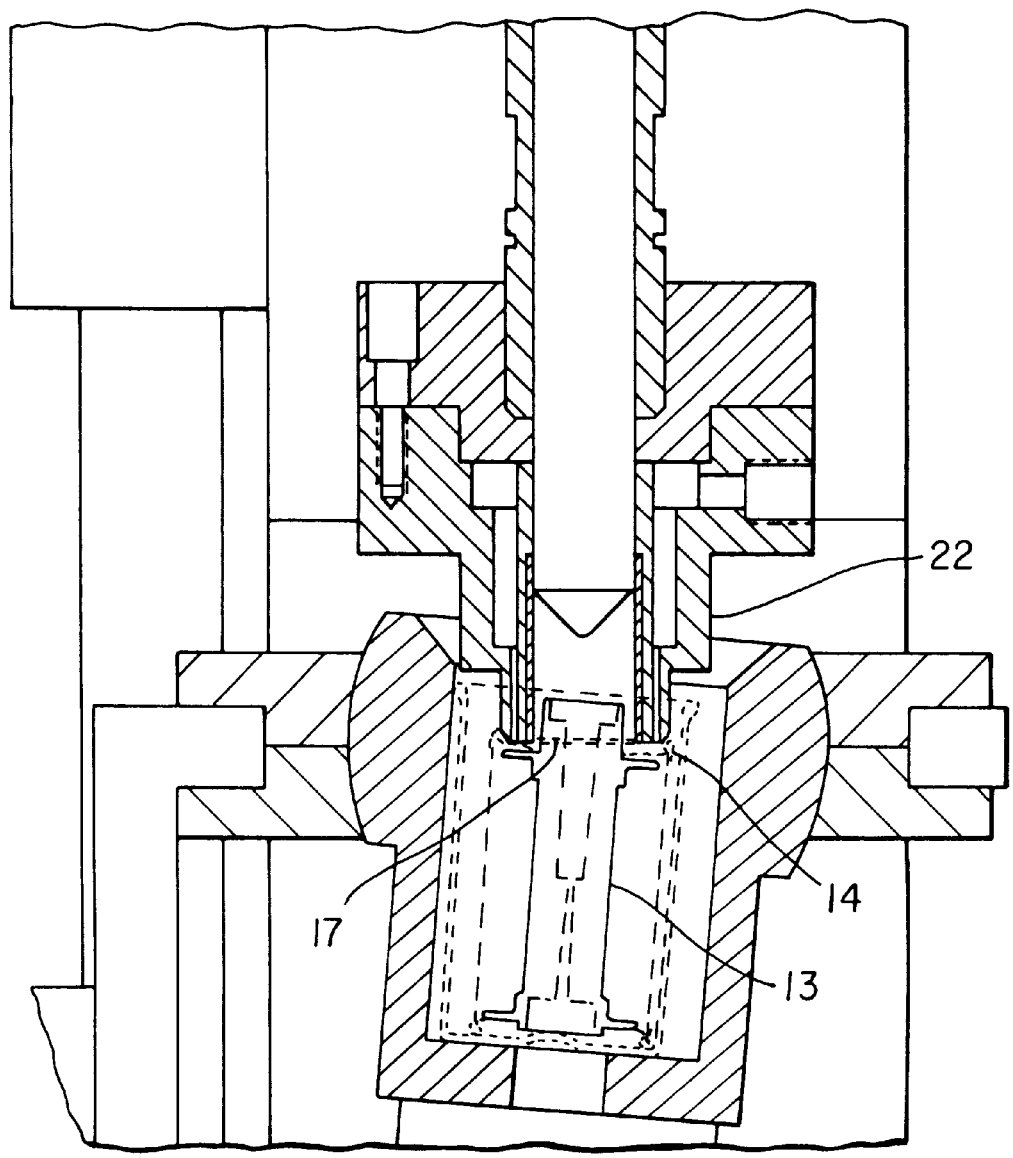
Figure 13:
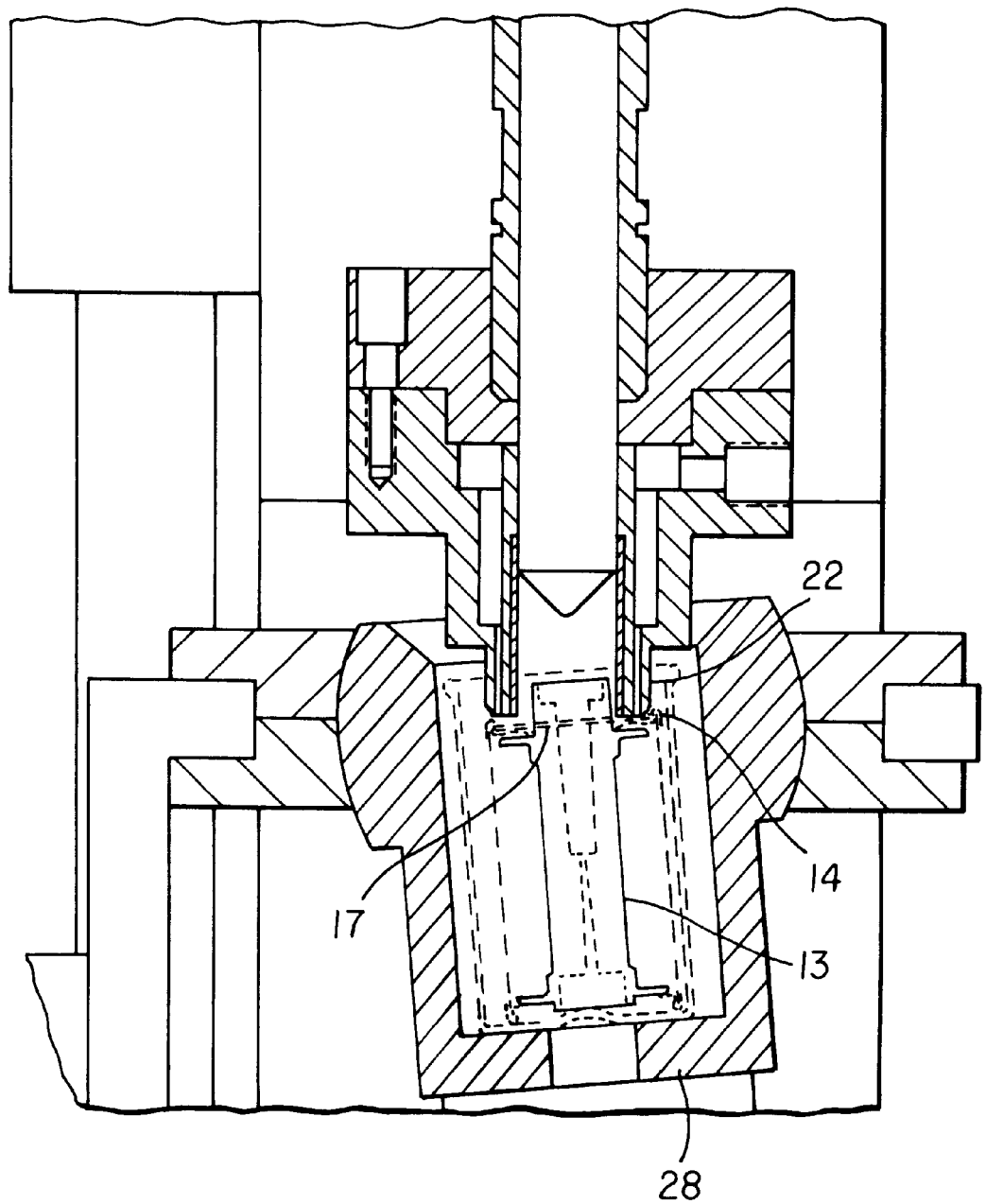

In FIG. 12, the tooling head 22, has been lowered further so that the outer exposed film indicator disk 17 is now inside of the end cap 14, but only on one side. The vacuum, supplied from port 39 to hold the outer disk 17 onto the tooling head is released, so the outer exposed film indicator disk 17 is now free to move. However, it is trapped by the spool and can not fall off. By only inserting one side or point at a time, there is room for the outer disk 17 to move away from the interference towards the opposite side of the cartridge. This phenomenon allows this assembly technique to work. By allowing the outer disk 17 on the exposed film indicator to float away from the point of interference, the amount of force required to insert the outer disk decreases at this point, since the assembly process is not attempting to force all of the teeth on the outer disk 17 to pass through the smaller diameter of the end cap 14 simultaneously. Instead only a couple teeth are assembled together at the same instant. As the cam follower 33 driven by the motor 35, and the pulley assembly 36 rotates, the point of assembly interference moves around the perimeter of the end cap 14. FIG. 13 is the same as FIG. 12 except the cam follower 33, and in turn the nest sub-assembly 2, are shown rotated 180° from the initial position, hence the nest sub-assembly is shown tipped in the opposite direction. The cam follower 33 will continue to rotate a minimum of one full revolution. The point of assembly interference will coincide with the point of the higher of the two cam followers 33. As the cam follower 33 rotates, the nest 22 will also continue its gimbal or wobble motion. As each point of the tooling head presses into the end cap 14, the outer exposed film indicator disk 17 is forced or squeezed into the crimp diameter of the end cap.

Figure 14:
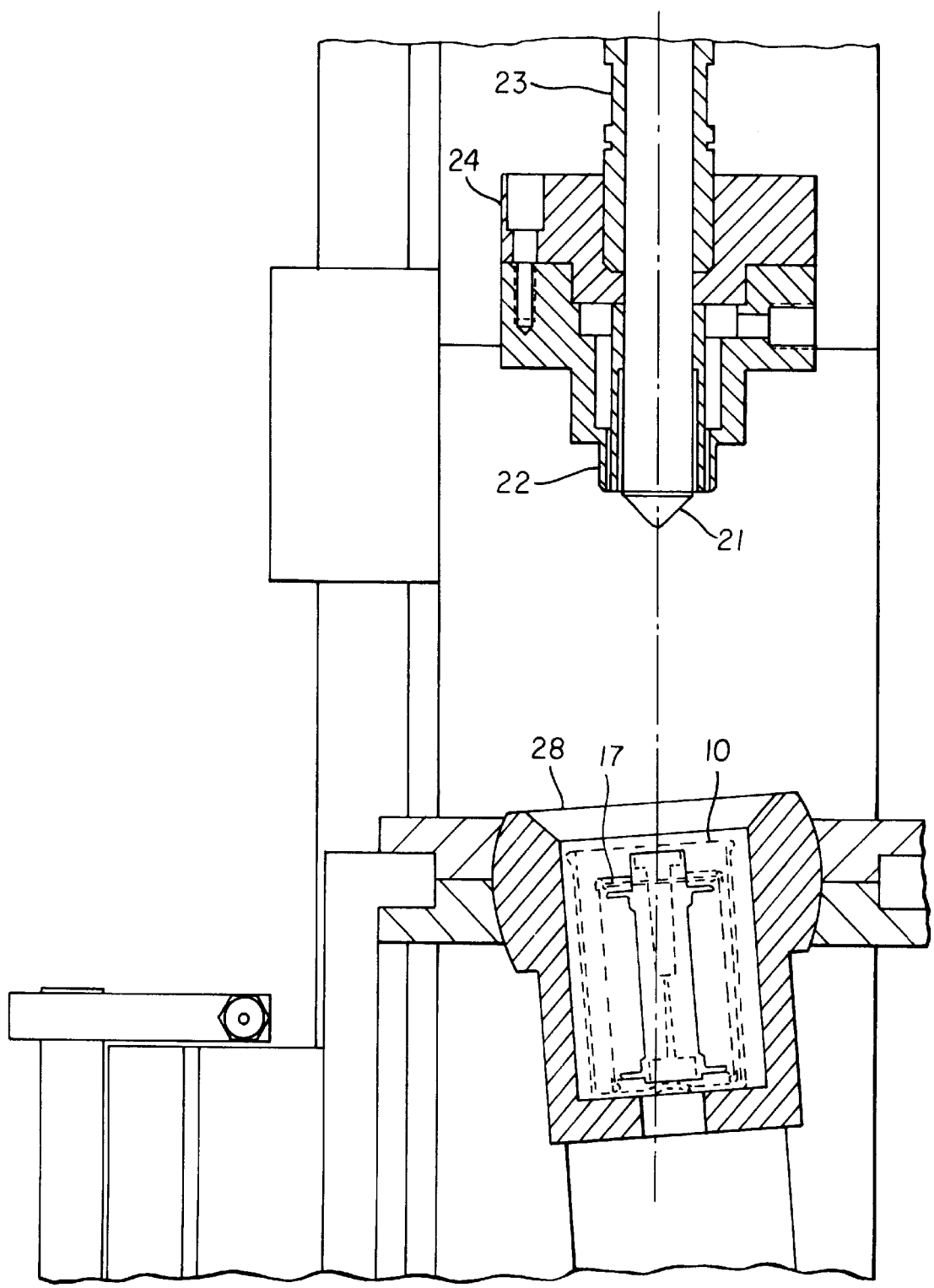

As shown in FIG. 14, after the cam follower 33 has made a minimum one complete revolution, and hence the nest sub-assembly 2 has completed its wobble motion, the tooling head 22 is raised back up by actuating the lead screw, and the centering shaft 21 is also extended back to its original position. The outer exposed film indicator disk 17 is now securely assembled to the end cap 14 of the cartridge 12.

Figure 15:
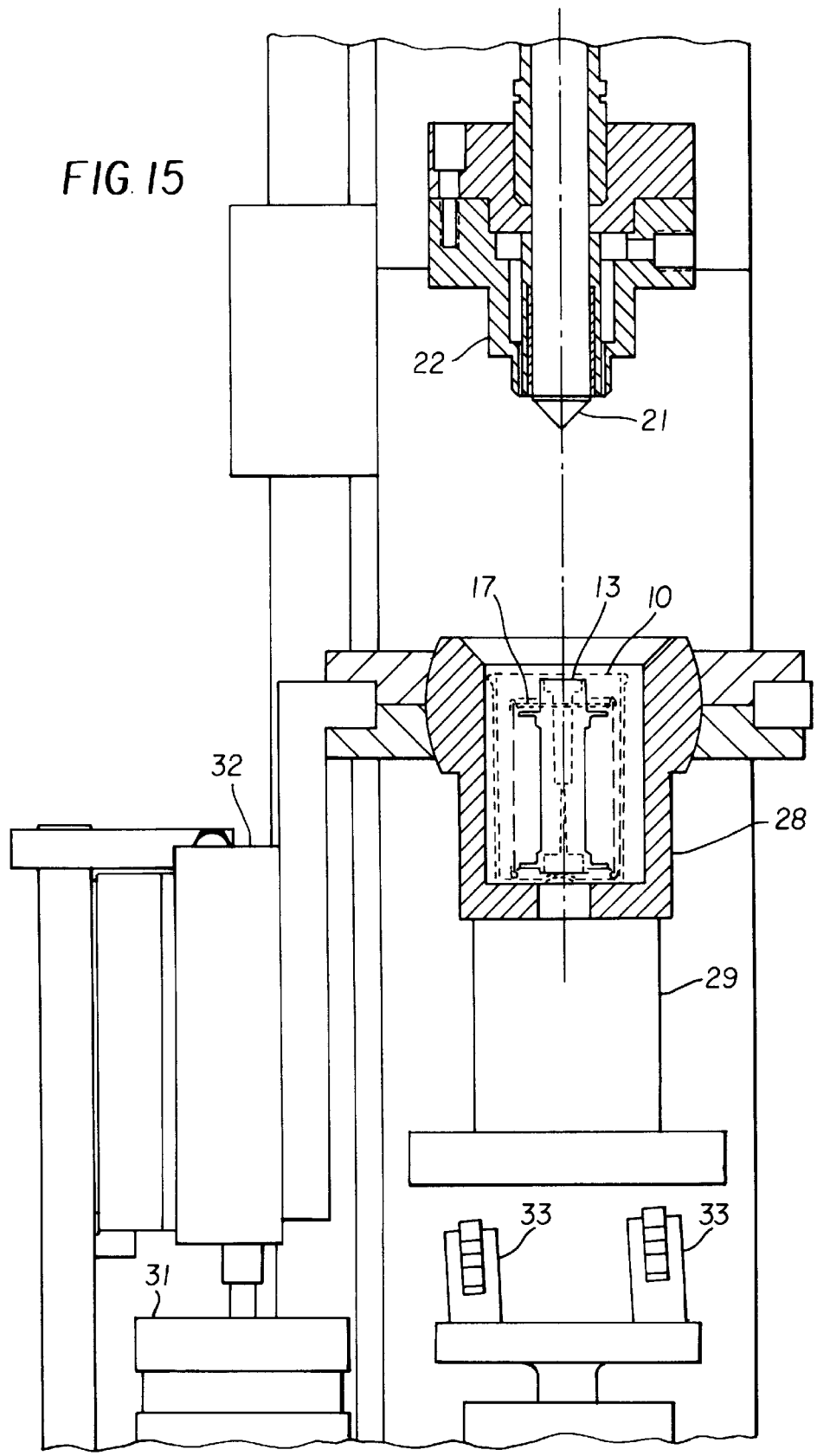
FIG. 15 shows the gimbaled assembly mechanism returned to the home position.

FIG. 15 shows all of the tooling subassemblies back at their original positions. The air cylinder 31 has been raised back up to its original position, disengaging the cam follower 33 from the cam plate 29, and allowing the entire nest sub-assembly 2 to straighten itself, by again pivoting in the spherical bearing seat 30. The motor (not shown) turning the cam follower 33 will also stop rotating. Once all of the subassemblies stop moving, the product assembly 10 (with the outer disk 17 attached) can be removed from the nest 28. The entire assembly sequence can now be repeated.

The many features and advantages of the invention are apparent from the detailed specification and thus it is intended by the appended claims to cover all such features and advantages which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

PARTS LIST

1. Tooling Head Sub-Assembly
2. Nest Sub-Assembly
3. Lead Screw Sub-Assembly
4. Cam Actuator Sub-Assembly
10. 35 mm Cartridge Product Assembly
11. Canister
12. Cartridge
13. Spool
14. End Caps (2)
15. Magazine
16. Leader
17. Outer Exposed Film Indicator Disk
21. Centering Shaft
22. Vacuum or Tooling Head
23. Piston
24. Air Spring
25. Air Spring Pressure Inlet Port
26. Centering Shaft Air Cylinder
27. Bearings (2)
28. Nest
29. Cam
30. Spherical Bearing Seat
31. Nest Air Cylinder
32. Slide
33. Cam Followers
34. Spindle
35. Motor
36. Pulley Assembly
37. Bearing Block
38. Nest Support Bracket
39. Vacuum Head Inlet Port

What is claimed is:

1. A process of inserting an outer disk of an exposed film indicator into a crimp diameter of an end cap of a film cartridge, the crimp diameter being smaller than the outside diameter of the outer disk, the process comprising the steps of:

a) delivering a film cartridge residing in a canister to a nest;

b) acquiring the outer disk on a centering shaft by vacuum acquisition;

c) centering the film cartridge to the centering shaft while the cartridge is in the canister thereby pressing the outer disk into the crimp diameter of the end cap on the film cartridge; and d) gimbaling the nest to rock the film cartridge in a circular motion thereby inserting the outer disk into the crimp diameter of the end cap.

2. The process of claim 1 wherein the film cartridge is a 35 mm film cartridge.

3. The process of claim 1 wherein the rocking step is performed using a tooling head.

4. The process of claim 1 wherein the cartridge is in said canister which is in said nest and the nest is rocked.

5. The process of claim 1 wherein the film cartridge is centered to an assembly tool.

6. An apparatus for centering a film cartridge comprising:

a) a tooling head containing an independently driven center capable of centering the cartridge which contains a spool and has two end caps;

b) a vacuum or tooling head attached to an opening to provide negative air pressure to the tooling head; and c) a nest mounted on a spherical bearing.

7. The apparatus of claim 6 wherein a cam is attached to the nest.

8. The apparatus of claim 7 wherein cam followers are positioned under the cam.

9. The apparatus of claim 8 wherein the cam followers are varied to a pre-determined difference in height to adjust the tilt angle.

* * * * *